United States Patent
Tanaka et al.

(10) Patent No.: US 7,048,978 B2
(45) Date of Patent: May 23, 2006

(54) POLYESTER RESIN, POLYESTER RESIN COMPOSITION, AND SHEET, FILM AND HOLLOW MOLDED CONTAINER OBTAINED THEREFROM

(75) Inventors: Tomohiko Tanaka, Yokkaichi (JP); Atsushi Kasai, Yokkaichi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 11/115,104

(22) Filed: Apr. 27, 2005

(65) Prior Publication Data

US 2005/0197484 A1 Sep. 8, 2005

Related U.S. Application Data

(63) Continuation of application No. PCT/JP03/13784, filed on Oct. 28, 2003.

(30) Foreign Application Priority Data

Oct. 31, 2002 (JP) .............................. 2002-317854

(51) Int. Cl.
*B29D 22/00* (2006.01)
*C08G 63/00* (2006.01)

(52) U.S. Cl. .................... 428/35.7; 528/307; 525/439; 428/38; 428/221

(58) Field of Classification Search ................ 528/307; 525/439; 428/35.7, 221, 38
See application file for complete search history.

(56) References Cited

U.S. PATENT DOCUMENTS 6,458,913 B1 * 10/2002 Honigfort et al. .......... 528/196
6,465,102 B1 * 10/2002 Honigfort et al. .......... 428/412

FOREIGN PATENT DOCUMENTS

EP           902052        3/1999
WO       EP 0 902 052    *  3/1999

* cited by examiner

*Primary Examiner*—Samuel A. Acquah
(74) *Attorney, Agent, or Firm*—Oblon, Spivak, McClelland, Maier & Neustadt, P.C.

(57) ABSTRACT

To provide a polyester resin particularly useful in application to optical films, etc.

A polyester resin which is an alicyclic polyester comprising dicarboxylic acid units and diol units, characterized by the following (1) to (4):

(1) the dicarboxylic acid units are composed mainly of 1,4-cyclohexanedicarboxylic acid units,
(2) the diol units are composed mainly of 1,4-cyclohexanedimethanol units,
(3) the ratio of alkyl ester terminals to all terminals of the polyester is at most 5 mol %, and
(4) the light transmittance of a molded plate of the resin having a thickness of 2 mm is at least 87%.

39 Claims, No Drawings

POLYESTER RESIN, POLYESTER RESIN COMPOSITION, AND SHEET, FILM AND HOLLOW MOLDED CONTAINER OBTAINED THEREFROM

TECHNICAL FIELD

The present invention relates to a polyester resin 1,4-cyclohexanedicarboxylic acid is the main dicarboxylic acid component, and its composition. Particularly, it relates to a colorless transparent polyester resin.

Polyester resins are used in a wide range of fields such as films, fibers and molded products. Among them, a polyester wherein 1,4-cyclohexanedicarboxylic acid (hereinafter, cyclohexanedicarboxylic acid may sometimes be abbreviated as CHDA) is the main dicarboxylic acid component, is expected to be used for various applications including optical films, from the viewpoint of the transparency, excellent hydrolysis resistance or weather resistance, and the small birefringence.

Polyester resins usually have a drawback such that the resins tend to be colored yellow or dull colored, probably because the production step is at a high temperature, and various proposals have been made to overcome such a drawback. For example, it is known that in order to prevent coloration, a phosphorus compound is added during the preparation of a polyester, or in order to hide a yellowish tint, a cobalt compound is added, or a blue dye is added (JP-A-2000-511211).

However, with respect to a polyester wherein 1,4-CHDA is the main dicarboxylic acid component, the above-mentioned methods are not necessarily satisfactory with respect to the color and transparency. Namely, if a phosphorus compound is added during the polymerization, yellowing may be prevented to some extent but not sufficiently, or depending upon the type of the catalyst, the polymerization degree tends to be inadequate. Whereas, if an organic dye or a cobalt compound is incorporated, the yellowish tint may be improved, but the light transmittance lowers, and the transparency tends to be inadequate.

On the other hand, as a polyester having a biodegradable nature and being excellent in heat resistance, moldability, solvent resistance such as alkaline resistance and mechanical properties, a polyester is known which comprises 1,4-cyclohexanedicarboxylic acid units and 1,4-cyclohexanedimethanol units (hereinafter cyclohexanedimethanol may sometimes be abbreviated as CHDM), wherein the molar ratio of trans-1,4-cyclohexanedicarboxylic acid units to cis-1,4-cyclohexanedicarboxylic acid units in the 1,4-cyclohexanedicarboxylic acid units, is from 60:40 to 100:0, and the molar ratio of trans-1,4-cyclohexanedimethanol units to cis-1,4-cyclohexanedimethanol units in the 1,4-cyclohexanedimethanol units, is from 40:60 to 100:0, but no attention is paid to the transparency or the color tint (JP-A-2000-290356).

BACKGROUND ART

In the above-mentioned JP-A-2000-290356, no detail is disclosed with respect to the starting material 1,4-cyclohexanedicarboxylic acid. However, a polyester obtained by using 1,4-cyclohexanedicarboxylic acid which is commonly used as the material for a polyester of this type, has been found to still have room for further improvement with respect to the transparency and color tint.

The present invention has been made in view of the above-described circumstances, and it is an object of the present invention to have the transparency improved in a polyester resin wherein 1,4-cyclohexanedicarboxylic acid is the main dicarboxylic acid component and preferably to provide a polyester resin having the yellowish tint further reduced. Further, it is an object of the present invention to provide a resin composition containing such a polyester resin, and a hollow container, sheet and film obtained by using such a polyester resin or a resin composition.

As a result of an extensive study, the present inventors have found that in a polyester resin wherein 1,4-cyclohexanedicarboxylic acid is the main dicarboxylic acid component, the light transmittance of the starting material monomer for the polyester is influential over the transparency and yellowing of the resin, and a polyester obtained by using 1,4-cyclohexanedicarboxylic acid having a specific light transmittance, has excellent transparency and color as compared with a polyester obtained by using conventional 1,4-cyclohexanedicarboxylic acid. The present invention has been accomplished on the basis of these discoveries.

Namely, the present invention provides a polyester resin which is an alicyclic polyester comprising dicarboxylic acid units and diol units, characterized in that (1) the dicarboxylic acid units are composed mainly of 1,4-cyclohexanedicarboxylic acid units, (2) the diol units are composed mainly of 1,4-cyclohexanedimethanol units, (3) the ratio of alkyl ester terminals to all terminals of the polyester is at most 5 mol %, and (4) the light transmittance of a molded plate of the resin having a thickness of 2 mm is at least 87%.

The present invention also provides a polyester resin which is a polyester resin obtained by reacting a dicarboxylic acid component containing 1,4-cyclohexanedicarboxylic acid as the main component, with a diol component, characterized in that (1) 1,4-cyclohexanedicarboxylic acid units constituting the polyester comprise trans-1,4-cyclohexanedicarboxylic acid units and/or cis-1,4-cyclohexanedicarboxylic acid units, (2) the ratio of trans-1,4-cyclohexanedicarboxylic acid units to the total 1,4-cyclohexanedicarboxylic acid units, is at least 85 mol %, and (3) the light transmittance of a molded plate of the resin having a thickness of 2 mm is at least 87%.

Such a polyester resin of the present invention preferably has a Yellowness Index (YI) of at most 18.

Further, the present invention provides a resin composition comprising the above polyester resin, and a thermoplastic resin and/or elastomer, and a hollow molded container, sheet or film obtained by using such a polyester resin or resin composition.

EFFECTS OF THE INVENTION

The polyester resin of the present invention is excellent in light transmittance and YI and is particularly useful in application to optical films, etc.

Further, the polyester resin composition comprising the polyester resin of the present invention, and a thermoplastic resin and/or elastomer other than the polyester resin, has good transparency and is excellent in heat resistance, and thus is useful as a polyester resin composition for a sheet, film, hollow container or the like.

BEST MODE FOR CARRYING OUT THE INVENTION

The polyester resin of the present invention is a polyester resin obtained by reacting a dicarboxylic acid component containing 1,4-cyclohexanedicarboxylic acid as the main component, with a diol component. In other words, the polyester resin of the present invention is one obtained by using a dicarboxylic acid component as the raw material, whereby as is different from a case where a dicarboxylate is used as the raw material, alkyl ester terminals are less. Namely, it is a polyester resin wherein the ratio of alkyl ester terminals to all terminals of the polyester is at most 5 mol %, preferably at most 1 mol %.

Further, the 1,4-cyclohexanedicarboxylic acid units constituting the polyester resin of the present invention comprise trans-1,4-cyclohexanedicarboxylic acid units and/or cis-1,4-cyclohexanedicarboxylic acid units, and the ratio of the trans-1,4-cyclohexanedicarboxylic acid units to the total 1,4-cyclohexanedicarboxylic acid units, is at least 85 mol %. This ratio is preferably at least 90 mol %, and the upper limit is 100 mol %. If the ratio of the trans-1,4-cyclohexanedicarboxylic acid units is less than 85 mol %, the melting point (Tm) of the polyester resin tends to be low, and a composition thereof with e.g. a polycarbonate will be poor in heat resistance.

Further, with the polyester resin of the present invention, Yellowness Index (YI) is preferably at most 18, more preferably at most 15. If YI exceeds 18, yellowness tends to be observed even by visual observation, and when it is formed into an optical film or the like, there will be a trouble such that a transmitted image tends to be yellowish, and the original image may not be reproduced. Further, the lower limit of YI is usually at a level of −5.

The polyester resin of the present invention is such that the light transmittance of a molded plate thereof having a thickness of 2 mm is at least 87%, preferably at least 87.5%, more preferably at least 88%. If such a light transmittance is less than 87%, for example, in the case of an optical film, there will be a trouble such that no adequate light will be transmitted, and the screen tends to be dark.

Further, the terminal acid value of the polyester resin of the present invention is not particularly limited, but it is usually preferably at most 70 equivalent/ton, and particularly when it is used in application to an optical film or the like to be assembled in a liquid crystal display device to be mounted on a vehicle and to be used in a high temperature high humidity condition, it is preferably at most 40 equivalent/ton, particularly preferably at most 30 equivalent/ton, further preferably at most 10 equivalent/ton. If the terminal acid value of the resin is large, the hydrolysis resistance tends to be poor. Here, control of the terminal acid value can be carried out, for example, by controlling the proportions of raw materials 1,4-CHDA and 1,4-CHDM, or by using an alkylenediol, particularly a $C_{2-10}$ alkylenediol, in combination as the diol raw material, in the after-mentioned production.

The polyester resin of the present invention can be obtained by subjecting the dicarboxylic acid component containing 1,4-CHDA as the main component, and the diol component, to an esterification reaction in the presence or absence of a catalyst and a polycondensation reaction in the presence of a catalyst, in accordance with conventional methods.

The dicarboxylic acid component as a raw material for the polyester resin of the present invention contains 1,4-cyclohexanedicarboxylic acid as the main component. Here, "contains 1,4-cyclohexanedicarboxylic acid as the main component" means that at least 60 mol % of the dicarboxylic acid units is 1,4-cyclohexanedicarboxylic acid, and preferably at least 80 mol %, more preferably at least 90 mol %, of the dicarboxylic acid units, is 1,4-cyclohexanedicarboxylic acid.

The raw material 1,4-cyclohexanedicarboxylic acid comprises trans-1,4-cyclohexanedicarboxylic acid and/or cis-1,4-cyclohexanedicarboxylic acid. In the present invention, at least 90 mol % thereof is preferably the trans-form, and more preferably, at least 95 mol % is the trans-form. As described above, the polyester resin of the present invention is one wherein the 1,4-cyclohexanedicarboxylic acid units constituting the polyester contain the trans-form in a specific ratio, and the ratio of the trans-form to the cis-form in the resin may be influenced by isomerization at the preparation stage of the polyester. However, by using a raw material containing at least 90% of the trans-form, the proportion of the trans-form of the obtained polyester can usually be made to be within the range of the present invention.

The raw material 1,4-CHDA in the present invention preferably has a large light transmittance at a wavelength of 340 nm from the viewpoint of the light transmittance of the obtainable polyester resin. Specifically, the light transmittance (hereinafter sometimes abbreviated as T-340) measured by the method of the following steps (1) to (3), is preferably at least 85%, more preferably at least 87%.

(1) By means of a spectrophotoelectric photometer, a 2N potassium hydroxide solution is put in a quartz cell with a light path of 10 mm and subjected to zero compensation, and then, (2) a liquid having 0.5 g of CHDA dissolved in 50 ml of a 2N potassium hydroxide solution, is put into a quartz cell with a light path of 10 mm, and (3) with respect to the liquid, the light transmittance at a wavelength of 340 nm is obtained by measurement.

If T-340 is less than 85%, the yellowness i.e. the YI value of the obtainable polyester resin tends to increase or the light transmittance of the polyester resin also tends to be low.

Further, as a method for producing the raw material 1,4-CHDA containing at least 95 mol % of the trans-form, a thermal isomerization process of the cis-form or a mixture of the cis-form and the trans-form of the 1,4-cyclohexanedicarboxylic acid, may be mentioned which has been previously proposed by the present inventor and which will be described in detail hereinafter. By a conventional precipitation method utilizing the difference in the solubility in e.g. water between the trans-form and the cis-form, T-340 of the obtainable 1,4-cyclohexanedicarboxylic acid will be low, and the light transmittance of the obtainable polyester resin will be inadequate. Thus, the thermal isomerization process is preferred from such a viewpoint that it is preferred to employ 1,4-CHDA containing at least 90 mol % of the transform and having T-340 of at least 85%.

The above thermal isomerization can be carried out by subjecting a mixture of cis-1,4-CHDA and trans-1,4-CHDA, or cis-1,4-CHDA, to heat treatment in an inert atmosphere within a temperature range of at least 180° C. and lower than the melting point of trans-1,4-CHDA. In the present invention, the melting point of trans-1,4-CHDA is meant for the melting point of trans-1,4-CHDA under the actual isomerization reaction conditions.

The pressure for the thermal isomerization reaction may be reduced pressure, normal pressure or elevated pressure. However, from the convenience of operation, it is usually from 1.3 to 950 kPa.

Further, in order to bring T-340 of 1,4-CHDA to a level of at most 85%, the inert atmosphere at the time of subjecting the cis/trans-1,4-CHDA mixture or cis-1,4-CHDA to heat treatment, is preferably adjusted so that the oxygen concentration in the gas phase in the reaction system would be at most 4,000 ppm, preferably at most 2,000 ppm, more preferably at most 1,000 ppm. If the oxygen concentration in the system is higher than 4,000 ppm, T-340 tends to be less than 85%.

In order to effectively obtain trans-1,4-CHDA formed by the thermal isomerization, a method may be mentioned wherein trans-1,4-CHDA is precipitated in molten cis-1,4-CHDA while maintaining the temperature within the above-mentioned range.

Further, the method for obtaining the mixture of the cis-form and trans-form 1,4-CHDA as the raw material for the thermal isomerization process, may, for example, be a method wherein terephthalic acid is subjected to nuclear hydrogenation in a liquid phase in the presence of a solvent, hydrogen and a hydrogenation catalyst to obtain it, or a method wherein sodium terephthalate is subjected to nuclear hydrogenation in a liquid phase in the presence of water, hydrogen and a hydrogenation catalyst and then precipitated by an acid.

As the dicarboxylic acid component other than 1,4-CHDA, one or more may be used, as a copolymer component, among aromatic dicarboxylic acids such as terephthalic acid, phthalic acid, isophthalic acid, 1,4-phenylenedioxydicarboxylic acid, 1,3-phenylenedioxydiacetic acid, 4,4'-diphenyldicarboxylic acid, 4,4'-diphenyl ether dicarboxylic acid, 4,4'-diphenyl ketone dicarboxylic acid, 4,4'-diphenoxyethanedicarboxylic acid, 4,4'-diphenylsulfone dicarboxylic acid and 2,6-naphthalene dicarboxylic acid, alicyclic dicarboxylic acids such as hexahydroisophthalic acid, and aliphatic dicarboxylic acids such as succinic acid, glutaric acid, adipic acid, pimelic acid, suberic acid, azelaic acid, sebacic acid, undecadicarboxylic acid and dodecadicarboxylic acid.

The diol component constituting the polyester resin of the present invention preferably contains 1,4-cyclohexanedimethanol as the main component. Here, "the main component" means at least 60 mol % of the diol component, preferably at least 80 mol %, further preferably at least 90 mol %, of the diol component is 1,4-cyclohexanedimethanol. Further, 1,4-CHDM is usually a mixture of the trans-form and the cis-form from the viewpoint of availability. However, the ratio of the trans-form to the cis-form is selected usually from 100:0 to 60:40 depending upon e.g. heat resistance required for the application.

Further, as the diol component other than 1,4-CHDM, one or more may be employed, as a copolymer component, among aliphatic diols such as ethylene glycol, trimethylene glycol, tetramethylene glycol, pentamethylene glycol, hexamethylene glycol, octametnylene glycol, decamethylene glycol, neopentyl glycol, diethylene glycol, polyethylene glycol and polytetramethylene ether glycol, alicyclic diols such as 1,2-cyclohexanediol, 1,4-cyclohexanediol, and 1,1-cyclohexanedimethylol, and aromatic diols such as xylylene glycol, 4,4'-dihydroxybiphenyl, 2,2-bis(4'-hydroxyphenyl)propane, 2,2-bis(4'-β-hydroxyethoxyphenyl)propane, bis(4-hydroxyphenyl)sulfone, and bis(4-β-hydroxyethoxyphenyl)sulfonic acid.

Further, a small amount of a copolymer component other than the above diol component and the dicarboxylic acid component, may, for example, be a hydroxycarboxylic acid or an alkoxycarboxylic acid, such as glycolic acid, p-hydroxybenzoic acid or p-β-hydroxyethoxybenzoic acid, a monofunctional component such as stearyl alcohol, benzyl alcohol, stearic acid, behenic acid, benzoic acid, t-butylbenzoic acid or benzoylbenzoic acid, or a at least trifunctional polyfunctional component such as tricarballylic acid, trimellitic acid, trimesic acid, pyromellitic acid, naphthalene tetracarboxylic acid, gallic acid, trimethylolethane, trimethylolpropane, glycerol, pentaerythritol or sugar ester.

The polyester resin of the present invention can be obtained by subjecting the dicarboxylic acid component containing 1,4-CHDA as the main component, and the diol component, to an esterification reaction in the presence or absence of a catalyst and to a polycondensation reaction in the presence of a catalyst.

The esterification reaction catalyst and the polycondensation catalyst may, for example, be a titanium compound, a germanium compound, an antimony compound or a tin compound, which is commonly used for the synthesis of a polyester.

Among them, a titanium compound is preferably employed, as it has a high activity in both the esterification reaction and the polycondensation reaction. The titanium compound may, for example, be tetra-n-propyl titanate, tetra-i-propyl titanate, tetra-n-butyl titanate, or a hydrolyzate of such an organic titanate. These titanates may be used alone or in combination.

The amount of the esterification reaction catalyst is usually from 50 to 2,000 ppm, preferably from 100 to 1,000 ppm, based on the polyester to be formed.

Further, in the production of the polyester, a magnesium compound, a phosphorus compound or the like, which is known as a component to be used in combination with the catalyst, may be used together for the purpose of controlling the catalytic activities or the degree of polymerization.

The esterification reaction of the dicarboxylic acid component with the diol component, is carried out by charging a dicarboxylic acid containing 1,4-cyclohexanedicarboxylic acid, of which at least 90 mol % is a trans-form, as the main component, and a diol, to an esterification reactor equipped with a stirrer and a distillation tube, adding a catalyst for the reaction, and stirring the mixture in an inert atmosphere, while distilling off water formed by the reaction. The ratio of the diol component to the dicarboxylic acid component is usually such that the diol component is from 1 to 2 mols per mol of the dicarboxylic acid component. However, in the case of a polyester resin wherein the diol component contains at least 80 mol % of 1,4-CHDM, as a preferred embodiment of the present invention, the molar ratio of the diol component per mol of the dicarboxylic acid component, is preferably from 1 to 1.2, more preferably from 1 to 1.1, most preferably from 1 to 1.05.

Further, in order to adjust the terminal acid value of the polyester resin to 40 equivalent/ton, for example, in a case where a dicarboxylic acid wherein at least 90 mol % is 1,4-CHDA, and a diol wherein at least 90 mol % is 1,4-CHDM, are employed, the ratio of the diol component per mol of the dicarboxylic acid component is made to be preferably from 1.02 to 1.2 mols, more preferably from 1.02 to 1.1 mols. Further, for example, in a case where a dicarboxylic acid wherein at least 90 mol % is 1,4-CHDA, and a diol component wherein from 80 to 99.5 mol % is 1,4-CHDM, and from 0.5 to 20 mol % is a $C_{2-10}$ alkylenediol, are used, the ratio of the diol component per mol of the dicarboxylic acid component is preferably from 1.02 to 1.2 mols, more preferably from 1.02 to 1.1 mols.

The esterification is carried out usually at a temperature of from 150° C. to 230° C., preferably from 180° C. to 220° C., usually for from 10 minutes to 10 hours, preferably from 30 minutes to 5 hours.

After the esterification reaction, the reaction solution is usually transferred to a polycondensation reactor equipped with a stirrer, a distillation tube and a vacuuming means. However, it is also possible to have the esterification reactor provided with a vacuuming means, so that the esterification reaction and the polycondensation reaction can be carried out in one reactor.

After completion of the esterification reaction, a polycondensation catalyst, etc. are added to the reaction solution, as the case requires, and while gradually reducing the pressure in the reactor, the polycondensation reaction is carried out. In a case where a polymerization catalyst is to be added, the amount is usually from 50 to 2,000 ppm, preferably from 100 to 1,000 ppm in a total amount to the polyester to be formed, as a total amount with the catalyst for the esterification reaction or ester exchange reaction.

The polycondensation is carried out at a temperature from the temperature upon completion of the esterification reaction to 300° C., preferably at most 265° C., usually for from 10 minutes to 10 hours, preferably from 30 minutes to 5 hours. If the temperature is too high, the polymerization reaction tends to hardly proceed, probably because heat decomposition takes place during the polymerization reaction. The pressure in the reactor is from normal pressure to a pressure which finally becomes at most 1 KPa, preferably at most 0.5 KPa.

After completion of the reaction, the obtained polyester is usually withdrawn in the form of a strand from the bottom of the rector, and cut while being cooled with water, to obtain pellets.

Further, the reaction may be carried out by a batch method or a continuous method.

The intrinsic viscosity of the polyester thus obtained is preferably from 0.6 to 1.5 dl/g, further preferably from 0.7 to 1.4 dl/g. If the intrinsic viscosity is less than 0.6 dl/g, the mechanical strength tends to be inadequate, and if it exceeds 1.5 dl/g, the fluidity tends to be low, and the moldability tends to be poor.

The obtained pelletized polyester resin may further be subjected to solid phase polymerization, as the case requires, to obtain one having a still higher intrinsic viscosity.

The polyester resin of the present invention is preferably such that at least 80 mol % of the diol units are 1,4-cyclohexanedimethanol, from the viewpoint of the heat resistance of the polyester resin. Further, a polyester resin wherein at least 80 mol % and at most 99.5 mol % of the diol units are 1,4-cyclohexanedimethanol units, and at least 0.5 mol % and at most 20 mol % thereof are $C_{2-10}$ alkylene diol units, particularly, a polyester resin wherein 1,4-cyclohexanedimethanol units are at least 90 mol % and at most 99.5 mol %, and $C_{2-10}$ alkylene diol units are at least 0.5 mol % and at most 10 mol %, is preferred from the viewpoint of hydrolysis resistance of the resin.

The polyester resin of the present invention can be used as a composition comprising the polyester resin of the present invention and at least one of other thermoplastic resins and/or thermoplastic elastomers. Such other thermoplastic resins may, for example, be a polycarbonate, a polyamide such as Nylon 6 or Nylon 66, a polyester resin such as polyethylene terephthalate, polybutylene terephthalate or 1,4-polycyclohexanedimethanol terephthalate, a styrene resin such as isotactic polystyrene, syndiotactic polystyrene or an acrylonitrile/butadiene/styrene resin (ABS), an acrylic resin such as polymethyl methacrylate (PMMA), a polyphenylene ether, a modified polyethylene ether, a polyoxymethylene, a polyether sulfine, a polysulfone, a polyether imide, and a mixture thereof. Preferably, a polycarbonate, a polyester resin such as a polyallylate, a polyethylene terephthalate or a polybutylene terephthalate, and a mixture thereof, may be mentioned. More preferably, a polycarbonate may be mentioned.

The thermoplastic elastomers may, for example, be a hydrogenated styrene/isoprene elastomer, a hydrogenated styrene/butadiene elastomer, a polyether ester elastomer, a polyolefin elastomer such as an ethylene/propylene elastomer, a polyether amide elastomer, and a polyurethane elastomer.

The ratio of such other thermoplastic resins and/or thermoplastic elastomers to the entire composition is such that the total amount of such thermoplastic resins and/or thermoplastic elastomers is usually from 1 to 99 wt %, preferably from 1 to 90 wt %.

The resin composition of the present invention may contain various additive components, as the case requires, within a range not to impair the purpose of the present invention. For example, various additives may be incorporated including an inorganic filler such as glass beads, glass powder, glass balloons, mica, talc or calcium carbonate, an antioxidant, a heat stabilizer, an ultraviolet absorber, a neutralizing agent, a lubricant, a compatibilizing agent, an antifogging agent, an antiblocking agent, a plasticizer such as paraffin oil, a fluorinated resin powder, a slipping agent, a dispersant, a colorant, a fungicide and a fluorescent brightener.

The resin composition of the present invention may be prepared by a conventional method for producing a thermoplastic resin composition. For example, it may be produced by preliminarily mixing the polyester resin of the present invention, a polycarbonate resin and additive components which may be incorporated as the case-requires, and then melt-kneading the mixture by e.g. a Banbury mixer, a roll mill, a Brabender, a single screw kneading extruder, a twin screw kneading extruder or a kneader.

The polyester resin of the present invention may be molded into a container, a sheet, a film or the like, by means of a melt molding method which is commonly used for polyesters.

For the production of a hollow molded container, a preform formed of the polyester resin of the present invention is subjected to stretch blow molding, and a conventional apparatus employed for blow molding of a polyester may be employed. Specifically, a preform is firstly prepared by e.g. injection molding or extrusion molding, and as it is or after processing the mouth portion or the bottom portion, it is reheated and subjected to a biaxial stretch blow molding method such as a hot parison method or a cold parison method. The molding temperatures in such a case, specifically the temperatures of nozzles and various parts of the cylinder of the molding machine, are usually within a range of from 200 to 260° C., and the stretching temperature is usually from 70 to 120° C., preferably from 80 to 110° C., and the stretching ratio is usually within a range of from 1.5 to 3.5 times in a longitudinal direction and from 2 to 4 times in a circumferential direction.

The obtained hollow molded container may be used as it is, but in the case of a content which requires hot filling, the container is usually further thermally-set in the blow molding form to further impart heat resistance before use. Such thermal setting is usually carried out under a tension by e.g. air pressure at a temperature of from 100 to 200° C., preferably from 120 to 180° C. for from a few seconds to a few hours, preferably from a few seconds to a few minutes.

For the production of a sheet or a film, there may, for example, be mentioned a casting method wherein a molten resin is extruded in a sheet or film-shape by means of a single layer or multilayer T-die or I-die connected to a screw extruder, a monoaxial stretching method wherein such a cast film is longitudinally stretched by utilizing the circumferential speed difference of a group of rolls, a biaxial stretching method wherein such a monoaxially stretched film is further transversely stretched by means of a tenter oven, or a simultaneous biaxial stretching method by a combination of the tenter oven and a linear motor. The thickness of the sheet or film can be controlled by the thickness of the opening of the T-die or I-die, for example, to be from 0.1 to 10 mm. The stretching temperature for stretching such a sheet or film, is usually from 70 to 120° C., preferably from 80 to 110° C., and the stretching ratio is usually from 1.1 to 10 times, preferably from 1.5 to 8 times, in the case of monoaxial stretching, and in the case of biaxial stretching, the stretching ratio is usually within a range of from 1.1 to 6 times, preferably from 1.5 to 4 times, in each of the longitudinal direction and the transverse direction.

The obtained stretched film may further be thermally set to improve the heat resistance and mechanical strength. Such thermal setting is carried out usually under tension at a temperature of from 120 to 200° C., preferably from 120 to 180° C., for from a few seconds to a few hours, preferably from a few seconds to a few minutes.

EXAMPLES

Now, the present invention will be described in further detail with reference to Examples, but it should be understood that the present invention is by no means restricted to the following Examples.

Measuring Methods

Yellowness Index

In accordance with JIS K7103, the tristimulus values X, Y and Z of sample pellets were measured by means of a photoelectric calorimeter (ND-300, manufactured by Nippon Denshoku Kogyo K.K.), and the Yellowness Index YI was obtained by calculation by the following formula:

$$YI=100(1.28X-1.06Z)/Y$$

Light Transmittance of Polymer

The pellets were dried at 100° C. for 5 hours by a vacuum drier and molded into a sheet of 90 mm×25 mm×2 mm (thickness) by a 15 ton electric injection molding machine (UT-15, manufactured by Toyo machinery & metal Co., Ltd.) at a molding temperature of 240° C. at a mold temperature of 60° C. The light transmittances at wavelengths of from 400 to 800 nm of this sheet, were measured every 2 nm by an ultraviolet/visible light spectrophotometer V-570, manufactured by JASCO Corporation, and the average value was taken as the light transmittance of the polymer.

Measurement of Light Transmittance (T-340) at Wavelength of 240 nm

Using a spectrophotoelectric photometer (U-1100, manufactured by Hitachi, Ltd.), a 2N potassium hydroxide solution was put into a quartz cell having a light path of 10 mm and subjected to zero-compensation. Then, a liquid having 5.0 g of CHDA dissolved in 50 ml of a 2N potassium hydroxide solution, was put into the quartz cell having a light path of 10 mm, and the transmittance was measured.

Quantitative Analysis of Tarns-form in Monomer CHDA

In a measuring flask of 50 ml, 0.2 g of CHDA was dissolved in 1.2 ml of 4N sodium hydroxide. Further, 40 ml of pure water was added, and 200 µl of phosphoric acid was added to adjust the pH to be 5, and then pure water was added to 50 ml. This sample was measured by liquid chromatography under the following conditions.

Apparatus: LC-10AD, manufactured by Shimadzu Corporation
Column: J'sphere ODS-H80 4.6 mm×250
Temperature: 50° C.
Moving phase: AcN/$H_2O$/$H_3PO_4$=200/800/4
Flow rate: 0.6 ml/min
Detector: UV (210 nm)
Injected amount: 20 µl From the respective peak areas, the proportions of the trans-form and the cis-form were obtained.

Quantitative Analyses of Trans-form and Cis-form of CHDA and CHDM in the Polymer, and Quantitative Analysis of the Terminal Alkyl Ester in the Polymer Using deuterated chloroform as a solvent, the polymer was dissolved, and by means of 1H-NMR (GSX-400, manufactured by JEOL Ltd.), quantitative analyses of the trans-form and the cis-form of the CHDA component and the 1,4-cyclohexanedimethanol component in the polymer were carried out.

Intrinsic Viscosity

The polymer was dissolved in a mixed liquid of phenol/tetrachloroethane (weight ratio: 1/1) as the solvent, and the intrinsic viscosity was obtained by measurement at 30° C. by means of an Ubbellohde viscometer.

Quantitative Analyses of Dicarboxylic Acid Units and Diol Units in the Polymer

The quantitative analyses were carried out by means of 1H-NMR in the same manner as the above-described quantitative analyses of the trans-form and the cis-form of CHDA and CHDM in the polymer.

Reference Example 1 (Preparation of CHDA-A)

A cis/trans mixed product of CHDA (manufactured by Eastman Chemical Company, cis/trans=73.7/26.3), was put into a glass flask, and after evacuation and substitution by nitrogen, thermal isomerization was carried out by holding it at 250° C. for one hour with stirring in a nitrogen gas flow having an oxygen concentration of 2 ppm. As a result of the analysis, the trans content was 95.9 mol %, and T-340 was 88.9%.

Reference Example 2 (Preparation of CHDA-B)

A mixture having 5 parts by weight of water added to 100 parts by weight of a cis/trans mixed product of CHDA (manufactured by Eastman Chemical Company, cis/trans=73.7/26.3), was put into a glass flask, and after evacuation and substitution, thermal isomerization was carried out at 250° C. for one hour with stirring in a nitrogen gas flow having an oxygen concentration of 2 ppm. As a result of the analysis, the trans content was 96.1 mol %, and T-340 was 96.2%.

Reference Example 3 (Preparation of CHDA-C)

Thermal isomerization was carried out in the same manner as in Reference Example 1 except that a nitrogen gas having an oxygen concentration of 8,500 ppm was used. As a result of the analysis, the trans content was 94.9 mol %, and T-340 was 79.6%.

Reference Example 4 (Preparation of CHDA-D)

10 Parts by weight of terephthalic acid, 90 parts by weight of water and 2 parts by weight of a Pd/C catalyst (50% hydrated product) were charged into a 130 L autoclave made of SUS316, and then a hydrogenation reaction was carried out with stirring at 150° C. under 5 MPa for about one hour until consumption of hydrogen was no longer observed. The obtained reaction solution was cooled to 110° C., and then, the catalyst was separated by filtration. The filtrate was further cooled to 25° C. and left to stand overnight to precipitate CHDA. Filtration was carried out by means of a centrifugal separator, and then, the obtained cake was dried at 110° C. under 5 mmHg for two hours to obtain a cis/trans mixed CHDA (cis/trans=31.6/68.4). By using this mixed CHDA, thermal isomerization was carried out in the same manner as in Reference Example 1. As a result of the analysis, the trans content was 94.1 mol %, and T-340 was 93.2%.

Reference Example 5 (Preparation of CHDA-E)

A cis/trans mixed product (manufactured by Eastman Chemical Company, cis/trans=73.7/26.3), was formed into a 30 wt % aqueous slurry, which was heated to 90° C. and mixed, and then solid-liquid separation was carried out by filtration under reduced pressure. The obtained cake was dried and analyzed, whereby the trans content was 98.2 mol %, and T-340 was 82.1%.

The physical properties and the preparation methods of the above various types of CHDA are summarized in the following Table.

Reference Example 6

Methyl 1,4-cyclohexanedicarboxylate (DMCD)

Dimethyl 1,4-cyclohexanedicarboxylate of the cis/trans mixed product (molar ratio of cis/trans=71.5/28.5) and water were cooled to a water temperature of 5° C. with stirring to have trans-DMCD precipitated. Then, it was subjected to filtration and taken out as a solid. The trans-form ratio in the taken out DMCD was 83.0%.

Further; in the following, as 1,4-cyclohexanedimethanol (CHDM), Rikabinol DM (molar ratio of cis/trans=30.5/69.5) manufactured by New Japan Chemical Co., Ltd., was used.

|  | Trans-form (%) | T-340 | Raw material | Treating method |
|---|---|---|---|---|
| CHDA-A | 95.9 | 88.9 | EC | Thermal isomerization, in $N_2$ flow containing 2 ppm of $O_2$ |
| CHDA-B | 96.1 | 96.2 | EC | Thermal isomerization, 5 wt % hydrated, in $N_2$ flow containing 2 ppm of $O_2$ |
| CHDA-C | 94.9 | 79.6 | EC | Thermal isomerization, in $N_2$ flow containing 8,500 ppm of $O_2$ |
| CHDA-D | 94.1 | 93.2 | Direct hydrogenation | Thermal isomerization, in $N_2$ flow containing 2 ppm of $O_2$ |
| CHDA-E | 98.2 | 82.1 | EC | Crystallization |

EC: cis/trans-CHDA, manufactured by Eastman Chemical Company

Example 1

In a reactor equipped with a stirrer, a distillation tube and an evacuation device, 184.2 g of CHDA-A, 158.1 g of 1,4-cyclohexanedimethanol and 0.87 ml of a 6% butanol solution of tetra-n-butyl titanate, were heated to 150° C. in a nitrogen flow and then heated to 200° C. over a period of one hour (the charged molar ratio of CHDA/CHDM was 100/102.5, CHDA-A: 100 parts by weight, CHDM: 85.8 parts by weight, 6% butanol solution of tetra-n-butyl titanate: 0.005 part by weight). Then, the mixture was held at 200° C. for one hour to carry out an esterification reaction. Then, while it was heated from 200° C. to 250° C. over a period of 45 minutes, a polycondensation reaction was carried out while gradually reducing the pressure in the reactor. After carrying out the polymerization under a pressure in the reactor of 0.1 KPa at a reaction temperature of 250° C. for 2.2 hours, the obtained polymer was withdrawn into water in the form of a strand and then pelletized. The obtained pellets were dried at 80° C. for 5 hours in a vacuum drier. The intrinsic viscosity of the polymer after the drying was 0.97 dl/g.

Further, the proportions of the trans-form and the cis-form of each of the 1,4-CHDA component and the 1,4-cyclohexanedimethanol component in the polymer were, 92% and 8%, and 72% and 28%, respectively.

The terminal acid value (AV) of the polymer was 58.8 equivalent/ton, and no terminal alkyl ester was detected. The CHDA component and the CHDM component in the polymer were analyzed by NMR, whereby CHDA/CHDM was 100/99.1.

Table 1 shows YI of the obtained polymer pellets, the light transmittance of a 2 mm sheet, and the hydrolysis resistance.

Example 2

A polymer having an intrinsic viscosity of 0.99 dl/g was obtained in the same manner as in Example 1 except that CHDA-B was used, and the polymerization time was changed to 1.9 hours. The proportions of the trans-form and the cis-form of each of the 1,4-CHDA component and the 1,4-cyclohexanedimethanol component in the polymer were 92% and 8%, and 71% and 29%, respectively.

The terminal acid value (AV) of the polymer was 68.0 equivalent/ton, and no terminal alkyl ester was detected. The CHDA component and the CHDM component in the polymer were analyzed by NMR, whereby CHDA/CHDM was 100/99.1.

Table 1 shows YI of the obtained polymer pellets, the light transmittance of a 2 mm sheet and the hydrolysis resistance.

Example 3

A polymer having an intrinsic viscosity of 0.99 dl/g was obtained in the same manner as in Example 1 except that CHDA-D was used, and the polymerization time was changed to 2.3 hours. The proportions of the trans-form and the cis-form of each of the 1,4-CHDA component and the 1,4-cyclohexanedimethanol component in the polymer were 91% and 9%, and 71% and 29%, respectively.

The terminal acid value (AV) of the polymer was 65.4 equivalent/ton, and no terminal alkyl ester was detected. The CHDA component and the CHDM component in the polymer were analyzed by NMR, whereby CHDA/CHDM was 100/99.1.

Table 1 shows YI of the obtained polymer pellets, the light transmittance of a 2 mm sheet, and the hydrolysis resistance.

Example 4

A polymer having an intrinsic viscosity of 1.00 dl/g was obtained in the same manner as in Example 2 except that the 6% butanol solution of tetra-n-butyl titanate was changed to 1.74 ml (0.01 part by weight), and the polymerization time was changed to 1.9 hours. The proportions of the trans-form and the cis-form in each of the 1,4-CHDA component and the 1,4-cyclohexanedimethanol component in the polymer were 91% and 9%, and 71% and 29%, respectively.

The terminal acid value (AV) of the polymer was 66.5 equivalent/ton, and no terminal alkyl ester was detected. The CHDA component and the CHDM component in the polymer were analyzed by NMR, whereby CHDA/CHDM was 100/99.1.

Table 1 shows YI of the obtained polymer pellets, the light transmittance of a 2 mm sheet, and the hydrolysis resistance.

Example 5

A polymer having an intrinsic viscosity of 1.00 dl/g was obtained in the same manner as in Example 4 except that CHDA-B was used, and 1,4-cyclohexanedimethanol was changed to 86.3 parts by weight, so that the charged molar ratio of CHDA/CHDM became 100/103. The proportions of the trans-form and the cis-form in each of the 1,4-CHDA component and the 1,4-cyclohexanedimethanol component in the polymer were 92% and 8%, and 72% and 28%, respectively.

The terminal acid value (AV) of the polymer was 20.2 equivalent/ton, and no terminal alkyl ester was detected. The CHDA component and the CHDM component in the polymer were analyzed by NMR, whereby CHDA/CHDM was 100/99.6.

Table 1 shows YI of the obtained polymer pellets, the light transmittance of a 2 mm sheet, and the hydrolysability.

Example 6

A polymer having an intrinsic viscosity of 0.83 dl/g was obtained in the same manner as in Example 4 except that CHDA-B was used, and 1,4-cyclohexanedimethanol was changed to 87.1 parts by weight, so that the charged molar ratio of CHDA/CHDM became 100/104. The proportions of the trans-form and the cis-form in each of the 1,4-CHDA component and the 1,4-cyclohexanedimethanol component in the polymer were 92% and 8%, and 71% and 29%, respectively.

The terminal acid value (AV) of the polymer was 7.7 equivalent/ton, and no terminal alkyl ester was detected. The CHDA component and the CHDM component in the polymer were analyzed by NMR, whereby CHDA/CHDM was 100/100.4.

Table 1 shows YI of the obtained polymer pellets, the light transmittance of a 2 mm sheet, and the hydrolysability.

Example 7

A polymer having an intrinsic viscosity of 0.96 dl/g was obtained in the same manner as in Example 2 except that CHDA-B was used, and 1,4-cyclohexanedimethanol was changed to 85.8 parts by weight, and ethylene glycol was changed to 0.008 part by weight, so that the charged molar ratio of CHDA/CHDM/EG became 100/102.5/2.5. The proportions of the trans-form and the cis-form in each of the 1,4-CHDA component and the 1,4-cyclohexanedimethanol component in the polymer were 91% and 9%, and 72% and 28%, respectively.

The terminal acid value (AV) of the polymer was 34.5 equivalent/ton, and no terminal alkyl ester was detected. The CHDA component, the CHDM component and the EG component in the polymer were analyzed by NMR, whereby CHDA/CHDM/EG was 100/98.6/1.4.

Table 1 shows YI of the obtained polymer pellets, the light transmittance of a 2 mm sheet, and the hydrolysability.

Example 8

A polymer having an intrinsic viscosity of 0.87 dl/g was obtained in the same manner as in Example 2 except that 1,4-cyclohexanedimethanol was changed to 85.8 parts by weight, and ethylene glycol was changed to 0.01 part by weight, so that the charged molar ratio of CHDA/CHDM/EG became 100/102.5/3.5. The proportions of the trans-form and the cis-form in each of the 1,4-CHDA component and the 1,4-cyclohexanedimethanol component in the polymer were 92% and 8%, and 71% and 29%, respectively.

The terminal acid value (AV) of the polymer was 1.3 equivalent/ton, and no terminal alkyl ester was detected. The CHDA component, the CHDM component and the EG component in the polymer were analyzed by NMR, whereby CHDA/CHDM/EG was 100/96.6/2.0.

Table 1 shows YI of the obtained polymer pellets, the light transmittance of a 2 mm sheet, and the hydrolysability.

Example 9

A polymer having an intrinsic viscosity of 0.94 dl/g was obtained in the same manner as in Example 2 except that 1,4-cyclohexanedimethanol was changed to 85.8 parts by weight and 1,4-butane diol was changed to 1.8 parts by weight, so that the charged molar ratio of CHDA/CHDM/BG became 100/102.5/2.0. The proportions of the trans-form and the cis-form in each of the 1,4-CHDA component and the 1,4-cyclohexanedimethanol component in the polymer were 91% and 9%, and 72% and 28%, respectively.

The terminal acid value (AV) of the polymer was 37.1 equivalent/ton, and no terminal alkyl ester was detected. The CHDA component, the CHDM component and the EG component in the polymer were analyzed by NMR, whereby CHDA/CHDM/BG was 100/98.1/1.3.

Table 1 shows YI of the obtained polymer pellets, the light transmittance of a 2 mm sheet, and the hydrolysability.

Example 10

A polymer having an intrinsic viscosity of 0.88 dl/g was obtained in the same manner as in Example 2 except that 1,4-cyclohexanedimethanol was changed to 85.8 parts by weight, and 1,4-butane diol was changed to 2.3 parts by weight, so that the charged molar ratio of CHDA/CHDM/BG became 100/102.5/2.5. The proportions of the trans-form and the cis-form in each of the 1,4-CHDA component and the 1,4-cyclohexanedimethanol component in the polymer were 91% and 9%, and 71% and 29%, respectively.

The terminal acid value (AV) of the polymer was 23.4 equivalent/ton, and no terminal alkyl ester was detected. The CHDA component, the CHDM component and the EG component in the polymer were analyzed by NMR, whereby CHDA/CHDM/BG was 100/98.3/1.6.

Table 1 shows YI of the obtained polymer pellets, the light transmittance of a 2 mm sheet, and the hydrolysability.

Example 11

A polymer having an intrinsic viscosity of 0.61 dl/g was obtained in the same manner as in Example 2 except that 1,4-cyclohexanedimethanol was changed to 85.8 parts by weight, and 1,4-butane diol was changed to 4.5 parts by weight, so that the charged molar ratio of CHDA/CHDM/BG became 100/102.5/5.0. The proportions of the trans-form and the cis-form in each of the 1,4-CHDA component and the 1,4-cyclohexanedimethanol component in the polymer were 91% and 9%, and 71% and 29%, respectively.

The terminal acid value (AV) of the polymer was 2.8 equivalent/ton, and no terminal alkyl ester was detected. The CHDA component, the CHDM component and the EG component in the polymer were analyzed by NMR, whereby CHDA/CHDM/BG was 100/98.1/1.3.

Table 1 shows YI of the obtained polymer pellets, the light transmittance of a 2 mm sheet, and the hydrolysability.

Comparative Example 1

A polymer having an intrinsic viscosity of 0.99 dl/g was obtained in the same manner as in Example 1 except that CHDA-C was used, and the polymerization time was changed to 1.9 hours. The proportions of the trans-form and the cis-form in each of the 1,4-CHDA component and the 1,4-cyclohexanedimethanol component in the polymer were 90% and 10%, and 70% and 30%, respectively. The terminal acid value (AV) of the polymer was 85.8 equivalent/ton, and no terminal alkyl ester was detected. The CHDA component and the CHDM component in the polymer were analyzed by NMR, whereby CHDA/CHDM was 100/99.0.

Table 1 shows YI of the obtained polymer pellets, the light transmittance of a 2 mm sheet, and the hydrolysis resistance.

Comparative Example 2

A polymer having an intrinsic viscosity of 0.99 dl/g was obtained in the same manner as in Example 1 except that CHDA-E was used, and the polymerization time was changed to 2.0 hours. The proportions of the trans-form and the cis-form in each of the 1,4-CHDA component and the 1,4-cyclohexanedimethanol component in the polymer were 90% and 10%, and 70% and 30%, respectively.

The terminal acid value (AV) of the polymer was 65.1 equivalent/ton, and no terminal alkyl ester was detected. The CHDA component and the CHDM component in the polymer were analyzed by NMR, whereby CHDA/CHDM was 100/99.2.

Table 1 shows YI of the obtained polymer pellets, the light transmittance of a 2 mm sheet, and the hydrolysis resistance.

Comparative Example 3

184.2 g of CHDA-E, 158.1 g of 1,4-cyclohexanedimethanol and 0.18 g of antimony acetate were heated to 150° C. in a nitrogen flow and then heated to 200° C. over a period of one hour (CHDA-E: 100 parts by weight, CHDM: 85.8 parts by weight, antimony acetate: 0.0098 part by weight). Then, an esterification reaction was carried out by holding it at 200° C. for one hour, and then 0.5 mg (0.0003 part by weight) of a blueing agent (Macrolex 2R, manufactured by Bayer Ltd.) was added. Then, while the temperature was raised from 200° C. to 250° C. for 45 minutes, a polycondensation reaction was carried out while the pressure in the reactor was gradually reduced. After carrying out the polymerization under a pressure in the reactor of 0.1 KPa at a reaction temperature of 250° C. for 4.5 hours, the obtained polymer was withdrawn into water in the form of a strand and then pelletized. The obtained pellets were dried at 80° C. for 5 hours in a vacuum drier. The intrinsic viscosity of the polymer after the drying was 0.84 dl/g.

Further, the proportions of the trans-form and the cis-form in each of the 1,4-CHDA component and the 1,4-cyclohexanedimethanol component in the polymer were 92% and 8%, and 72% and 28%, respectively.

The terminal acid value (AV) of the polymer was 73.1 equivalent/ton, and no terminal alkyl ester was detected. The CHDA component and the CHDM component in the polymer were analyzed by NMR, whereby CHDA/CHDM was 100/99.1.

Table 1 shows YI of the obtained polymer pellets, the light transmittance of a 2 mm sheet, and the hydrolysis resistance.

Comparative Example 4

The operation was carried out in the same manner as in Example 2 except that CHDA-D was used, the 1,4-cyclohexanedimethanol was changed to 85.8 parts by weight, and 1,4-butane diol was changed to 71.6 parts by weight, so that the charged molar ratio of CHDA/CHDM/BG became 100/100/60, but the polymerization reached a sealing and was terminated after the polymerization time of 5 hours. The polymer was analyzed, and the intrinsic viscosity was 0.18 dl/g.

Comparative Example 5

A polymer having an intrinsic viscosity of 1.05 dl/g was obtained in the same manner as in Example 2 except that the dimethyl 1,4-cyclohexanedicarboxylate was changed to 100 parts by weight, and the 1,4-cyclohexanedimethanol was changed to 71.6 parts by weight, so that the charged molar ratio of DMCD/CHDA became 100.5/100. The proportions of the trans-form and the cis-form in each of the 1,4-CHDA component and the 1,4-cyclohexanedimethanol component in the polymer were 82% and 18%, and 71% and 29%, respectively. The terminal acid value (AV) of the polymer was 7.9 equivalent/ton, and the proportion of the terminal alkyl ester was 94%. The CHDA component, the CHDM component and the EG component in the polymer were analyzed by NMR, whereby CHDA/CHDM was 100/100.

Table 1 shows YI of the obtained polymer pellets, the light transmittance of a 2 mm sheet, and the hydrolysability.

Comparative Example 6

A polymer having an intrinsic viscosity of 0.76 dl/g was obtained in the same manner as in Example 2 except that the dimethyl 1,4-cyclohexanedicarboxylate was changed to 100 parts by weight, and the 1,4-cyclohexanedimethanol was changed to 69.7 parts by weight, and the 1,4-butane diol was changed to 0.023 part by weight, so that the charged molar ratio of DMCD/CHDM/BG became 103/100/4.8. The proportions of the trans-form and the cis-form in each of the 1,4-CHDA component and the 1,4-cyclohexanedimethanol component in the polymer were 83% and 17%, and 72% and 28%, respectively.

The terminal acid value (AV) of the polymer was 5.8 equivalent/ton, and the proportion of the terminal alkyl ester was 44%. The CHDA component, the CHDM component and the EG component in the polymer were analyzed by NMR, whereby CHDA/CHDM was 100/100.

Table 1 shows YI of the obtained polymer pellets, the light transmittance of a 2 mm sheet, and the hydrolysability.

The results of Examples 1 to 11 and Comparative Examples 1 to 3 are summarized in Table 1.

TABLE 1

| | | 1,4-CHDA | | | Ratio of raw materials charged | Polymerization conditions | | |
|---|---|---|---|---|---|---|---|---|
| | Monomer constituting dicarboxylic acid units | Transform (%) | T-340 (%) | Method for preparing trans-form | Dicarboxylic acid/CHDM/short chain diol (molar ratio) | Amount of catalyst (ppm) | Polymerization temperature (° C.) | Polymerization time (hr) |
| Ex. 1 | CHDA | 95.9 | 88.9 | Thermal isomerization | 100/102.5/0 | TBT25 | 250 | 2.2 |
| Ex. 2 | CHDA | 96.1 | 96.2 | Thermal isomerization | 100/102.5/0 | TBT25 | 250 | 1.9 |
| Ex. 3 | CHDA | 94.1 | 93.2 | Thermal isomerization | 100/102.5/0 | TBT25 | 250 | 2.3 |
| Ex. 4 | CHDA | 96.1 | 96.2 | Thermal isomerization | 100/102.5/0 | TBT50 | 250 | 1.9 |
| Ex. 5 | CHDA | 96.1 | 96.2 | Thermal isomerization | 100/103/0 | TBT50 | 250 | 2.0 |
| Ex. 6 | CHDA | 96.1 | 96.2 | Thermal isomerization | 100/104/0 | TBT50 | 250 | 2.0 |
| Ex. 7 | CHDA | 96.1 | 96.2 | Thermal isomerization | 100/102.5/EG2.5 | TBT25 | 250 | 2.2 |
| Ex. 8 | CHDA | 96.1 | 96.2 | Thermal isomerization | 100/102.5/EG3.5 | TBT25 | 250 | 2.3 |
| Ex. 9 | CHDA | 96.1 | 96.2 | Thermal isomerization | 100/102.5/BG2.0 | TBT25 | 250 | 2.5 |
| Ex. 10 | CHDA | 96.1 | 96.2 | Thermal isomerization | 100/102.5/BG2.5 | TBT25 | 250 | 2.6 |
| Ex. 11 | CHDA | 96.1 | 96.2 | Thermal isomerization | 100/101/BG5.0 | TBT25 | 250 | 3.3 |
| Comp. Ex. 1 | CHDA | 94.9 | 79.6 | Thermal isomerization | 100/102.5/0 | TBT25 | 250 | 1.9 |
| Comp. Ex. 2 | CHDA | 98.2 | 82.1 | Crystallization | 100/102.5/0 | TBT25 | 250 | 2.0 |
| Comp. Ex. 3 | CHDA | 98.2 | 82.1 | Crystallization | 100/102.5/0 | Sb acetate 250 | 250 | 4.5 |
| Comp. Ex. 4 | CHDA | 98.2 | 82.1 | Crystallization | 100/100/BG60 | TBT25 | 250 | 5 |
| Comp. Ex. 5 | DMCD | — | — — | — | 100.5/100/0 | TBT25 | 265 | 2.5 |
| Comp. Ex. 6 | DMCD | — | — — | — | 103/100/BG4.8 | TBT25 | 253 | 2.7 |

| | Physical properties of polymer | | | | | | | |
|---|---|---|---|---|---|---|---|---|
| | Dicarboxylic acid/CHDM/short chain diol (molar ratio) | Transform in CHDA component (%) | Intrinsic viscosity (dl/g) | AV (eq/ton) | Terminal alkyl ester (%) | Hydrolysis resistance (%) | YI | Sheet Light transmittance (%) |
| Ex. 1 | 100/99.1/0 | 92 | 0.97 | 58.8 | ND | 64.3 | 16.9 | 87.8 |
| Ex. 2 | 100/99.1/0 | 92 | 0.99 | 68.0 | ND | 52.1 | 7.2 | 90.2 |
| Ex. 3 | 100/99.1/0 | 91 | 0.99 | 65.4 | ND | 52.8 | 12.2 | 87.4 |
| Ex. 4 | 100/99.1/0 | 91 | 1.00 | 66.5 | ND | 51.1 | 13.8 | 89.6 |
| Ex. 5 | 100/99.6/0 | 92 | 1.00 | 20.2 | ND | 73.6 | 11.2 | 89.9 |
| Ex. 6 | 100/100.4/0 | 92 | 0.83 | 7.7 | ND | 86.0 | 9.8 | 90.3 |
| Ex. 7 | 100/97.4/1.4 | 91 | 0.96 | 34.5 | ND | 70.4 | 5.8 | 90.3 |
| Ex. 8 | 100/96.6/2.0 | 92 | 0.87 | 1.3 | ND | 95.4 | 5.5 | 90.2 |
| Ex. 9 | 100/98.1/1.3 | 91 | 0.94 | 37.1 | ND | 70.1 | 6.2 | 90 |
| Ex. 10 | 100/98.3/1.6 | 91 | 0.88 | 23.4 | ND | 71.9 | 4.7 | 90.1 |
| Ex. 11 | 100/99.9/3.1 | 90 | 0.61 | 2.8 | ND | 95.2 | 2.4 | 90.4 |
| Comp. Ex. 1 | 100/99.0 | 90 | 0.99 | 85.8 | ND | 44.3 | 33.3 | 86.3 |
| Comp. Ex. 2 | 100/99.2 | 92 | 0.99 | 65.1 | ND | 53.4 | 19.8 | 84.5 |
| Comp. Ex. 3 | 100/99.1 | 92 | 0.84 | 73.1 | ND | 50.2 | −1.1 | 84.1 |
| Comp. Ex. 4 | — | — | 0.18 | — | ND | — | — | — |
| Comp. Ex. 5 | 100/100/0 | 83 | 1.05 | 7.9 | 94 | 63.9 | 12.9 | 88.8 |
| Comp. Ex. 6 | 100/97.1/2.9 | 82 | 0.76 | 5.8 | 44 | 64.8 | 4.8 | 89.2 |

\* Abbreviations in the Table represent the following.
CHDA: Cyclohexanedicarboxylic acid
DMCD: Dimethyl cyclohexanedicarboxylate
EG: Ethylene glycol
BG: 1,4-butane diol
TBT: Tetra-n-butyl titanate
ND: Not detected

Example 12

30 Parts by weight of the polyester obtained in accordance with the method in Example 2 and 70 parts by weight of a polycarbonate (Iupilon S3000N, manufactured by Mitsubishi Engineering-Plastics Corporation) were dry-blended and then extruded by a small size twin screw kneader (KWZ15-30MG, manufactured by TECHNOVEL CO.) at a set temperature of 270° C. at a rotational speed of 150 rpm at a discharge rate of 1.5 kg/hr while carrying out deaeration, to obtain pellets.

YI of the obtained polymer pellets was −0.5, and the light transmittance of a 2 mm sheet was 89.0%.

Comparative Example 7

The operation was carried out in the same manner as in Example 12 except that the polyester obtained in accordance with the method of Comparative Example 2 was used. YI of the obtained polymer pellets was 2.9, and the light transmittance of a 2 mm sheet was 87.2%.

Example 13

Using the polyester resin obtained in accordance with the method of Example 2, a preform was formed by FE80S model injection molding machine manufactured by Nissei Plastic Industrial Co., Ltd. wherein the temperature for various parts of the cylinder and the nozzle head was set at 250° C., the screw rotational speed was set to be 100 rpm, the injection time was set to be 10 seconds and the mold cooling temperature was set to be 10° C. Using this preform, blow molding was carried out by a stretch blow molding machine wherein the preheating furnace temperature was set to be 90° C., the blow pressure was set to be 20 kg/cm² and the molding cycle was set to be 10 seconds, to obtain a bottle having an internal capacity of 1.5 liters, wherein the average wall thickness of the body portion was 300 μm.

This bottle was filled with hot water of 85° C., stoppered tightly and then inverted for 15 minutes, whereupon deformation of the bottle was observed, whereby no liquid leakage or no deformation at the mouth portion, the shoulder portion or the body portion, was observed.

Example 14

Using the polyester resin obtained in accordance with the method of Example 1, a sheet having a thickness of 300 μm was formed by an extruder of 30 mm in diameter wherein the temperature of various parts of the cylinder and the nozzle head was set to be 250° C., the screw rotational speed was set to be 40 rpm and the extrusion rate was set to be 80 g/min. This sheet was subjected to simultaneous biaxial stretching for 3×3 times by a long biaxial stretching machine (manufactured by T. M. Long company) wherein the internal temperature was set to be 95° C., to obtain a stretched film having a thickness of 30 μm.

This film had very high transparency with an average light transmittance of 88% at a wavelength of from 400 to 800 nm.

The polyester resin of the present invention with a light transmittance of at least 87%, preferably at least 88%, is excellent in the light transmittance of a film. Accordingly, for example, when it is used as an optical film for a liquid crystal display device wherein a plurality of optical films are used as laminated, there is a merit such that as compared with a film having a low light transmittance, the light source intensity can be made low from the viewpoint of the brightness (luminance) of the liquid crystal display device having such an optical film is installed. Further, in the case of a mobile terminal such as a notebook computer, the power consumption of the battery will be reduced, thus leading to a merit that it can be operated for a long time. Thus, the light transmittance being at least 87% may be regarded as far superior to a case where the light transmittance is less than 87% (the polyester resins in Comparative Examples).

Further, in a preferred embodiment, the terminal acid value is at most 40 equivalent/ton, whereby the hydrolysis resistance will be improved, and there will be a merit such that when such a film is used as an optical film for a liquid crystal display device for a vehicle, it is less likely that breakage or fogging takes place due to a decrease in the strength of the film, whereby brightness of the liquid crystal device decreases thus leading to poor viewability.

INDUSTRIAL APPLICABILITY

The polyester resin of the present invention is excellent in transparency, hydrolysis resistance and weather resistance and has a small birefringence and thus can be effectively used for the production of optical films, etc. The polyester resin composition comprising the polyester resin of the present invention, and a thermoplastic resin and/or elastomer other than such a polyester resin, has good transparency and is excellent in heat resistance, and thus is useful as a polyester resin composition for sheets, films, hollow containers, etc.

The entire disclosure of Japanese Patent Application No. 2002-317854 filed on Oct. 31, 2003 including specification, claims and summary is incorporated herein by reference in its entirety.

What is claimed is:

1. A polyester resin which is an alicyclic polyester comprising dicarboxylic acid units and diol units, characterized in that (1) the dicarboxylic acid units are composed mainly of 1,4-cyclohexanedicarboxylic acid units obtained by thermal isomerization, (2) the diol units are composed mainly of 1,4-cyclohexanedimethanol units, (3) the ratio of alkyl ester terminals to all terminals of the polyester is at most 5 mol %, and (4) the light transmittance of a molded plate of the resin having a thickness of 2 mm is at least 87%.

2. The polyester resin according to claim 1, wherein the 1,4-cyclohexanedicarboxylic acid units comprise trans-1,4-cyclohexanedicarboxylic acid units and/or cis- 1,4-cyclohexanedicarboxylic acid units, and the ratio of trans-1,4-cyclohexanedicarboxylic acid units to the total 1,4-cyclohexanedicarboxylic acid units, is at least 85 mol %.

3. The polyester resin according to claim 1, wherein the ratio of trans-1,4-cyclohexanedicarboxylic acid units to the total 1,4-cyclohexanedicarboxylic acid units, is at least 90 mol %.

4. The polyester resin according to claim 1, wherein Yellowness Index (YI) is at most 18 according to JIS K7103.

5. The polyester resin according to claim 1, which is one obtained by using 1,4-cyclohexanedicarboxylic acid which, when formed into a solution having 5.0 g dissolved in 50 ml of a 2N potassium hydroxide aqueous solution, has a light transmittance of at least 85% at a wavelength of 340 nm.

6. The polyester resin according to claim 1, wherein at least 80 mol % of the diol units are 1,4-cyclohexanedimethanol.

7. The polyester resin according to claim 1, wherein at least 80 mol % and at most 99.5 mol % of the diol units are 1,4-cyclohexanedimethanol units, and at least 0.5 mol % and at most 20 mol % thereof are $C_{2-10}$ alkylenediol units.

8. The polyester resin according to claim 1, wherein the terminal acid value is at most 40 equivalent/ton.

9. A polyester resin which is a polyester resin obtained by reacting a dicarboxylic acid component containing 1,4-cyclohexanedicarboxylic acid as the main component, with a diol component, characterized in that (1) 1,4-cyclohexanedicarboxylic acid units constituting the polyester comprise trans-1,4-cyclohexanedicarboxylic acid units and/or cis-1,4-cyclohexanedicarboxylic acid units obtained by thermal isomerization, (2) the ratio of trans-1,4-cyclohexanedicarboxylic acid units to the total 1,4-cyclohexanedicarboxylic acid units, is at least 85 mol %, and (3) the light transmittance of a molded plate of the resin having a thickness of 2 mm is at least 87%.

10. The polyester resin according to claim 9, wherein the ratio of trans-1,4-cyclohexanedicarboxylic acid units is at least 90 mol %.

11. The polyester resin according to claim 9, wherein Yellowness Index (YI) is at most 18 according to JIS K7103.

12. The polyester resin according to claim 9, wherein the 1,4-cyclohexanedicarboxylic acid, when formed into a solution having 5.0 g thereof dissolved in 50 ml of a 2N potassium hydroxide aqueous solution, has a light transmittance of at least 85% at a wavelength of 340 nm.

13. The polyester resin according to claim 9, wherein at least 80 mol % of the diol units are 1,4-cyclohexanedimethanol.

14. The polyester resin according to claim 9, wherein at least 80 mol % and at most 99.5 mol % of the diol units are 1,4-cyclohexanedimethanol, and at least 0.5 mol % and at most 20 mol % thereof are C2–10 alkylenediol.

15. The polyester resin according to claim 9, wherein the terminal acid value is at most 40 equivalent/ton.

16. A resin composition comprising the polyester resin as defined in claim 1, and a thermoplastic resin and/or elastomer other than the polyester resin.

17. The resin composition according to claim 16, wherein the thermoplastic resin and/or elastomer other than the polyester resin, is a polycarbonate.

18. A hollow molded container obtained by using the polyester resin as defined in claim 1.

19. A sheet or film obtained by using the polyester resin as defined in claim 1.

20. A resin composition comprising the polyester resin as defined in claim 9, and a thermoplastic resin and/or elastomer other than the polyester resin.

21. The resin composition according to claim 20, wherein the thermoplastic resin and/or elastomer other than the polyester resin, is a polycarbonate.

22. A hollow molded container obtained by using the polyester resin as defined in claim 9.

23. A sheet or film obtained by using the polyester resin as defined in claim 9.

24. A hollow molded container obtained by using the resin composition as defined in claim 16.

25. A sheet or film obtained by using the resin composition as defined in claim 16.

26. A hollow molded container obtained by using the resin composition as defined in claim 20.

27. A sheet or film obtained by using the resin composition as defined in claim 20.

28. The polyester resin according to claim 1, wherein the light transmittance of a molded plate of the resin having a thickness of 2 mm is at least 88%.

29. The polyester resin according to claim 9, wherein the light transmittance of a molded plate of the resin having a thickness of 2 mm is at least 88%.

30. The polyester resin according to claim 1, wherein the dicarboxylic acid units comprise a mixture of cis and trans isomers obtained by thermally isomerizing a mixture of cis- and trans-1,4-cyclohexane dicarboxylic acid units in the presence of water in a nitrogen atmosphere.

31. The polyester resin according to claim 9, wherein the dicarboxylic acid units comprise a mixture of cis and trans isomers obtained by thermally isomerizing a mixture of the cis- and trans-1,4-cyclohexane dicarboxylic acid units in the presence of water in a nitrogen atmosphere.

32. The polyester resin according to claim 1, wherein the dicarboxylic acid comprises 1,4-cyclohexanedicarboxylic acid subjected to thermal isomerization by heating a mixture of the cis and trans isomers of the 1,4-cyclohexanedicarboxylic acid at a temperature of between 180° C. and lower than the melting point of the dicarboxylic acid.

33. The polyester resin according to claim 9, wherein the dicarboxylic acid comprises 1,4-cyclohexanedicarboxylic acid subjected to thermal isomerization by heating a mixture of the cis and trans isomers of the 1,4-cyclohexanedicarboxylic acid at a temperature of between 180° C. and lower than the melting point of the dicarboxylic acid.

34. The polyester resin according to claim 32, wherein the thermal isomerization is carried out in an atmosphere that comprises at most 4,000 ppm of oxygen.

35. The polyester resin according to claim 33, wherein the thermal isomerization is carried out in an atmosphere that comprises at most 4,000 ppm of oxygen.

36. The polyester resin according to claim 34, wherein the amount of oxygen is at most 2,000 ppm.

37. The polyester resin according to claim 35, wherein the amount of oxygen is at most 2,000 ppm.

38. The polyester resin according to claim 34, wherein the amount of oxygen is at most 1,000 ppm.

39. The polyester resin according to claim 35, wherein the amount of oxygen is at most 1,000 ppm.

* * * * *